United States Patent [19]

Wittich

[11] Patent Number: 4,683,909

[45] Date of Patent: Aug. 4, 1987

[54] RESERVOIR LOADING VALVE WITH PRESSURE PROTECTION OF THE RESERVOIR CIRCUIT

[75] Inventor: Kurt Wittich, Lohr, Fed. Rep. of Germany

[73] Assignee: Mannesmann Rexroth GmbH, Lohr, Fed. Rep. of Germany

[21] Appl. No.: 698,404

[22] Filed: Feb. 5, 1985

[30] Foreign Application Priority Data

Feb. 9, 1984 [DE] Fed. Rep. of Germany ....... 3404598

[51] Int. Cl.[4] .............................................. F16K 31/12

[52] U.S. Cl. ................................ 137/505.11; 251/25; 137/487.5; 137/505

[58] Field of Search ............................ 251/25, 27, 28; 137/455, 485, 487, 505, 505.11, 505.13, 505.14, 505.2; 417/288, 299, 302, 307, 311

[56] References Cited

U.S. PATENT DOCUMENTS

| | | | |
|---|---|---|---|
| 2,487,716 | 11/1949 | Majneri | 137/505 X |
| 2,888,027 | 5/1959 | Gerwig et al. | 137/505.11 X |
| 2,984,251 | 5/1961 | Quinby | 137/487.5 X |
| 3,832,095 | 8/1974 | Akima et al. | 417/307 |
| 4,286,615 | 9/1981 | Stumpp et al. | 137/487 X |
| 4,519,573 | 5/1985 | Bartholomaus et al. | 251/25 X |

*Primary Examiner*—Larry Jones

[57] ABSTRACT

A reservoir loading valve accomplishing a pressure protection of the reservoir circuit comprises a pre-control valve subject to the pressure of the control circuit and which controls depending on this pressure a switching valve the piston of which in turn controls the connection between a pump and a working hydraulic and the reservoir circuit. The reservoir circuit is supplied with pressure fluid through a blind bore and a transverse bore in the piston of the switching valve, while a flow control orifice is provided in the blind bore and controls the size of the flow of volume flowing to the reservoir circuit. When the reservoir is loaded and the working hydraulic circuit is connected, the piston of the switching valve will be displaced by the high pressure delivered by the pump into a position in which the connection between the pump and the reservoir circuit is completely interrupted. In this way pressure peaks occurring in the working circuit and which may exceed the maximum permissible reservoir pressure cannot affect the reservoir circuit. Furthermore, it is also possible to operate the working hydraulic circuit with pressures far beyond the maximum permissible pressures if the reservoir.

17 Claims, 3 Drawing Figures

RESERVOIR LOADING VALVE WITH PRESSURE PROTECTION OF THE RESERVOIR CIRCUIT

BACKGROUND OF THE INVENTION

The invention relates to a reservoir or accumulator loading valve, and more particularly to a loading valve of the type wherein a pre-control valve subjected to pressure of a reservoir circuit, the pre-control valve controlling a switching valve depending on this pressure and the switching valve having a piston controlling the connection between a pump and a working hydraulic circuit while the reservoir circuit is supplied with pressure fluid via a flow control diagram and a check valve.

Such a reservoir loading valve is known from German Patent Publication No. 30 34 457, in which the reservoir circuit is supplied with pressure fluid via a loading conduit which branches off from a conduit leading from the pump to the switching valve. The loading conduit the direction of flow has a flow control orifice and a check valve. If the switching valve keeps the connection between the pump and the working hydraulic circuit open and if the same is supplied with pressure fluid there exits also a connection between the working hydraulic circuit and the reservoir circuit so that pressure peaks occuring in the working circuit may be propagated into the reservoir circuit. Such pressure peaks which may exceed the maximum pressure of the resevoir preset and a pre-control valve by a considerable amount are damped by the reservoir or accumulator. However, the reservoir thereby receives each time a corresponding pressure fluid volume so that its pressure may increase well beyond the desired maximum pressure. This must be taken into consideration when designing the reservoir as far as strength requirements and the necessary safety precautions are concerned. Depending on the design of the valves in the reservoir circuit, and on other circumstances, additional measures must be taken to protect the same against this pressure. Furthermore, with the above-described arrangement of the known reservoir loading valve it is not possible to operate the working hydraulic system with higher pressures than the maximum permissible reservoir pressure.

It is, therefore, an object of the present invention to provide a reservoir loading valve followed by a working hydraulic system, in which the reservoir circuit is not subject to pressure peaks beyond a pre-determined maximum permissible pressure. Furthermore, it is an object of the present invention to operate the working hydraulic system with any desired pressure without influencing the reservoir circuit.

BRIEF SUMMARY OF THE INVENTION

This object is accomplished in accordance with a invention by providing the piston of the switching valve with a blind bore and a transverse bore through which the reservoir circuit is supplied with pressure fluid; by providing a flow control orifice within the blind bore, and by having the piston occupying a position in which the connection to the reservoir circuit is completely interrupted when the reservoir is loaded and the working hydraulic circuit is connected thereto, i.e., when the working hydraulic circuit is in an activated condition under a supply pressure.

By connecting the reservoir circuit via the blind bore and transverse bore in the piston of the switching valve, with the pump, the piston may be displaced so far by the high pressure occuring when the working hydraulic system is connected, i.e., supplied with pressure that the connection between the reservoir circuits and the pump is completely interrupted if the reservoir is loaded and the pre-control valve has relieved the spring-loaded end face of the piston. In this case, pressure peaks occuring in the working circuit, does not cause any damage in the reservoir circuit, and it is possible to operate the working hydraulic circuit with pressures which are much higher than the maximum pressure permissible in the reservoir.

By coordinating the dimensions and structure of the piston and the annular spaces of the housing in such a way, the excess amount of fluid supplied by the pump exceeds a priority amount determined by the size of the flow control orifice fed to the accumulator or reservoir circuit, as can be the same for instance with constant pumps (constant feed flow). The phrase "priority amount" means that the fluid flow supplied by the pump has a priority over all other fluid flows.

BRIEF DESCRIPTION OF THE DRAWING

An example of the invention is described in detail in the detail description in connection with the attached schematic drawings, in which.

DETAILED DESCRIPTION OF A PREFERRED EMBODIMENT

Figure 1:
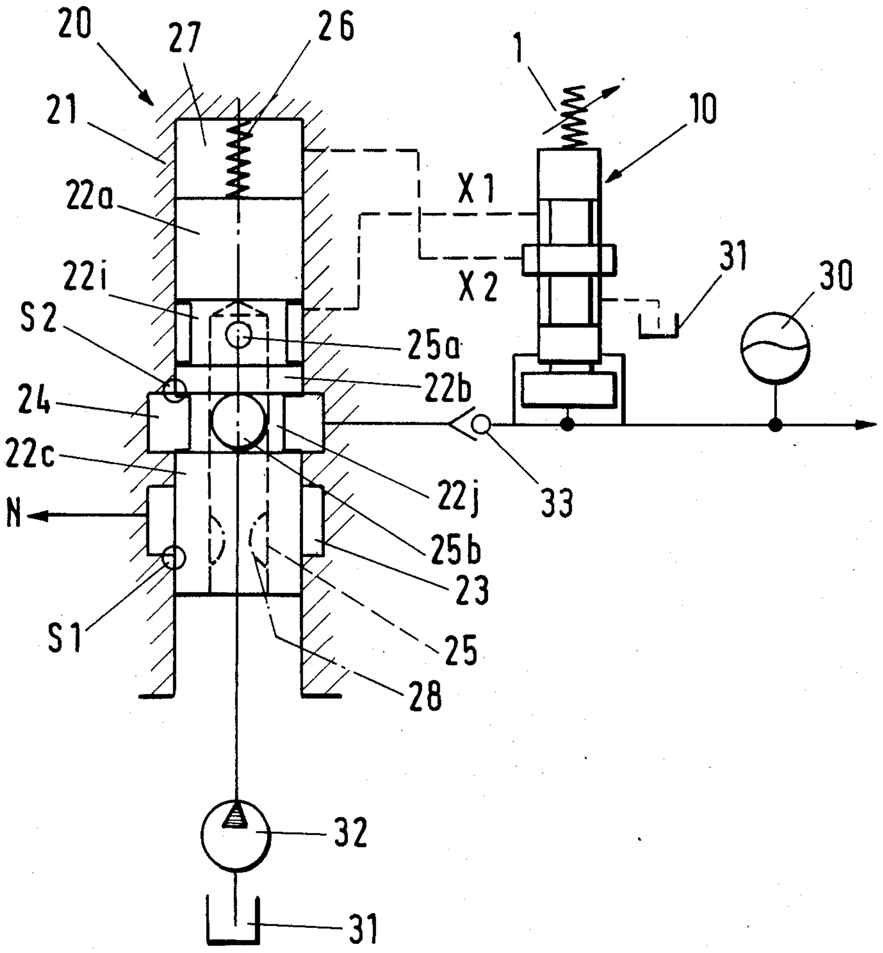
FIG. 1 shows the reservoir loading valve according to the invention illustrating the cooperation of the piston with the control edges.

FIG. 1 shows the structural design of the reservoir loading valve. It comprises a pre-control valve 10 subjected to the pressure of a reservoir or accumulator 30 for controlling a switching valve 20 depending on the pressure of the reservoir. The pre-control valve 10 may have any desired structure as long as it fulfills the following functions: assuming a loaded reservoir it must maintain a connection between a control conduit X2 and a container 31 for pressure fluid until the reservoir pressure has fallen to a minimum pressure value. Once this condition has been reached it must establish a connection between the second control conduit X2 and a first control conduit X1 and must not interrupt the same until the desired maximum reservoir pressure has been reached. At the latter instance again a connection between the control conduit X2 and the container 31 must be established. The two control conduits are connected to the switching valve 20 and influence the same, as described below.

The switching valve 20 has a piston 22 sliding in the bore of a housing 21 and having three sections **22*a*, 22*b*, 22*c*, of equal diameter which are interconnected by sections 22*i* and 22*j* of smaller diameter. The bore is widened in two areas to form annular spaces 23 and 24. The piston 22 is provided with a blind bore 25 extending an axial direction and having at its end in the area of the section 22*i* a transverse bore 25*a*, in the area of the section 22*j* a transverse bore 25*b* and in the area of the section 22*c* a flow control orfice 28. One closed end face of the piston which together with the housing confines a space 27, is loaded by a spring 26 whereas the other end face from which the blind bore 25 extends is subject to the pressure fluid flow coming from a pump 32. The dimensions of the individual piston sections, the blind bore with its transverse bores and the two annular spaces are such that in a certain position of the piston shown in the drawing the annular chamber 24 in the housing lies opposite section 22***j* and forms a control edge S2 while the annular space 23 is completely covered by the section 22*c* of the piston and thereby forms a control edge S1 cooperating with the end face of section 22*c*; and the control edge S2 cooperates with sections 22*b* and 22*c* of the piston between which the section 22*j* with transverse bore 25*b* is formed. The dimensions are further so that upon movement of the piston against the force of the spring 26 the control edge S2 close the connection between the pump and the reservoir circuit before the control edge S1 opens the connection to the annular chamber 23 (connection N) completely. It is of course understood that the structural design of the control edges can be achieved by suitably selected other geometrical shapes of the piston and the housing.

The switching valve 20 is tied-in with the hydraulic arrangement consisting of the reservoir 30, the pre-control valve 10 and a working hydraulic system, in the following manner: a connection N which leads to one or more actuating valves (not shown) of the working hydraulic system is connected to the annular chamber 23, whereas a conduit leading to the reservoir 30 and in which there is provided a check valve 33 and the pressure of which is transmitted downstream of the check valve to the pre-control valve, is connected to the annular chamber 24. The control conduit X2 is connected to the space 27 in which the spring is provided, and the conduit X1 leads to the bore in housing 21 in such a way that it is constantly located opposite the section 22*i* of the piston and is therefore subject to the pressure in the transverse bore 25*a*.

Figure 2:
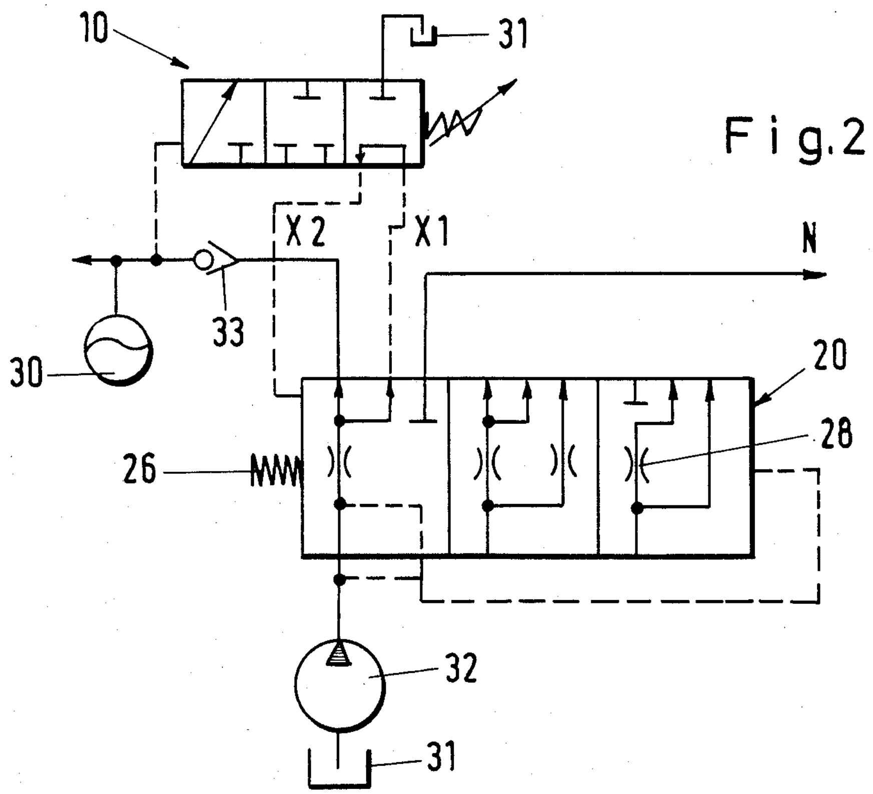
FIG. 2 is a block diagram of the reservoir loading valve in connection with a constant pump.
Figure 3:
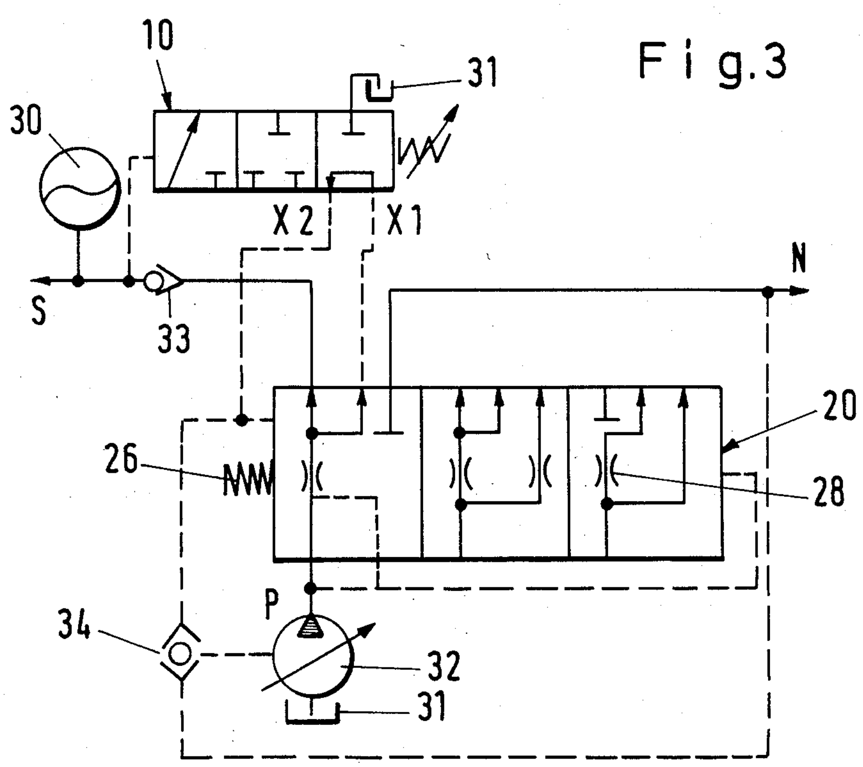
FIG. 3 is a block diagram of the reservoir loading valve with a controlled pump, i.e., for a loading-compensated system.

The function of the reservoir loading valve is described hereafter, reference being made to FIGS. 2 and 3 which represents the possible combinations of connections.

If the working hydraulic is not connected or active, i.e., if the connection is without pressure or has a lower pressure than the reservoir and if the reservoir is unloaded while the pre-control valve 10 interconnects the control conduits X1 and X2, the pumps will supply a volume of fluid (priority amount) into the reservoir circuit, which is determined by the size of the flow control orifice 28 since the piston of the switching valve 20 is located in its lower position because of the pressure acting on its spring-loaded end face, which pressure corresponds to the pressure in transverse bore 25*a*. If the fluid flow of the pump is greater than the priority amount the piston is lifted by the increasing pressure to such an extent that the excess amount is removed at connection N. When the reservoir pressure reaches the pressure set at the pre-control valve via a spring 1, the pre-control valve will connect the control conduit X2 with the container 31 so that the end face of the piston confining the space 17 is essentially loaded only by the spring 26 and the piston will move against the force of the spring. Thus, when the working hydraulic system is not connected and inactive, the volume of fluid supplied by the pump at low pressure is removed at connection N and is returned to the pump in a manner not illustrated. Upon connection or activation of the working hydraulic circuit the pump pressure increases to the required high value and thereby displaces the piston to such an extent that the control edge S2 closes the connection to the reservoir circuit completely. Consequently an increase in pressure in the reservoir circuit beyond the pre-set pressure is not possible even if pressure peaks and higher pressure should occur in the working circuit. If in this condition the reservoir pressure falls to the lower minimum permissible pressure, the control conduits X1 and X2 are again connected to each other by the pre-control valve and the piston is moved by the pressure increase and its spring-loaded end face in the direction of the spring force to the extent that the control edge S2 opens the transverse bore 25*b* and the priority amount flows to the reservoir circuit. The reservoir is being loaded again.

FIG. 3 shows a block diagram for a controlled pump with a load-compensated system. In this case, the pressure of the control conduit X2 is fed to a change-over valve 34 and is there compared with the respective pressure in the working circuit. Depending on the result of this comparison the flow volume delivered by the pump is adjusted. The function of the reservoir loading valve also in this case corresponds to the above.

Disclosed herein is a reservoir loading valve which accomplishes a pressure protection of the reservoir circuit. It comprises a pre-control valve subject to the pressure of the reservoir circuit and which depending on this pressure controls a switching valve the piston of which in turn controls the connection between a pump and a working hydraulic circuit and the reservoir circuit. The reservoir circuit is supplied with pressure fluid by a blind bore and a transverse bore provided in the piston in the switching valve while a flow control orifice is provided in the blind bore which determines the amount of the volume flow to the reservoir circuit. When the reservior is loaded and the working hydraulic system is connected and active, the piston of the switching valve is displaced by the high pressure delivered by the pump into a position in which the connection between the pump and the reservoir circuit is completely interrupted. In this way the pressure peaks occuring in the working circuit and which exceed the maximum permissible reservoir pressure have no effect on the reservoir circuit. Furthermore, it is also possible to operate the working hydraulic system with pressures which are far beyond the maximum permissible reservoir pressures.

Various modification in structure and/or function may be made to the disclosed embodiments by one skilled in the arts without departing from the scope of the invention as defined by the claims.

What is claimed is:

1. A reservoir loading system which includes a switching valve and a pre-control valve subject to pressure of a reservoir circuit, the pre-control valve controlling the switching valve in accordance with the reservoir circuit pressure, the switching valve comprising:

piston means for controlling a connection between a pump and a working fluid circuit, the piston means having a blind bore and a first transverse bore through which the reservoir circuit is supplied with fluid pressure; and a flow control orifice means within the blind bore for controlling the volume of fluid provided to the reservoir circuit;

whereby when a reservoir is loaded and the working fluid circuit is pressurized, the piston means is completely disconnected from the reservoir circuit.

2. A system according to claim 1 wherein the blind bore includes a second transverse bore and first control circuit means connected to the pre-control valve, the first control circuit means being continuously supplied with fluid pressure via the second transverse bore.

3. A system according to claims 1 or 2 wherein the piston means forms with a housing of the switching valve first and second control edges, the first control edge, when located in the flow direction and controlling the connection to the working fluid circuit, and the second control edge controls the connection to the reservoir circuit.

4. A system according to claim 3, wherein the first control edge is formed by a first annular space provided in the housing and cooperates with a first section of the piston means in the flow direction, the second control edge is formed by a second annular space located downstream and cooperates with the first section of the piston means and a second section of the piston means and a second section of the piston means.

5. A system according to claim 3 wherein the second control edge closes before the first control edge has completely opened the connection to the working fluid circuit.

6. A system according to claim 4, wherein the frist annular space is connected to the working fluid circuit and the second annular space is connected to the reservoir.

7. A system according to claim 6 wherein the second control edge closes before the first control edge has completely opened the connection to the working fluid circuit.

8. A system according to claim 4 wherein the second control edge closes before the first control edge has completely opened the connection to the working fluid circuit.

9. A system according to claim 4 where in the piston means includes a third section of a diameter smaller than the first and second sections, in which the second transverse bore extends.

10. A system according to claim 9 wherein the piston means includes a fourth section of a diameter substantially the same as the first and second sections, and a spring means located in a space between the fourth section and the housing.

11. A system according to claim 10 wherein a second control circuit means is connected between the space and the pre-control valve for maintaining fluid pressure between the reservoir and the pre-control valve until the reservoir pressure has fallen to a minimum pressure value.

12. A system according to claim 4 wherein the first and second sections are of the same diameter and are connected by a third section of smaller diameter in which the first transverse bore extends.

13. A system according to claim 4 wherein the first control edge cooperates with an end face of the first section piston means and the second control edge cooperates with a lower edge of the second section piston means, the second control edge being in alignment with the second annular space.

14. A system according to claim 13 wherein the second annular space has a given dimension such that the piston means is moved equivalent to the given dimension in order to close the connection of the pump through the transverse bore to the reservoir.

15. A system according to claim 14 wherein before the connection between the pump through the transverse bore to the reservoir is closed, the movment of the lower edge passes the first control edge and opens the connection between the pump and the first annular space.

16. A system according to claim 1 wherein a second control circuit means is connected to a changeover valve means for comparing the fluid pressure in the second control circuit means with the fluid pressure in the working fluid circuit.

17. A system according to claim 1 wherein actuation of the pre-control valve is adjustable by a spring.

* * * * *